United States Patent
Yan et al.

(10) Patent No.: US 12,121,833 B2
(45) Date of Patent: Oct. 22, 2024

(54) SLURRY FILTERING APPARATUS AND COATING SYSTEM

(71) Applicant: CONTEMPORARY AMPEREX TECHNOLOGY CO., LIMITED, Ningde (CN)

(72) Inventors: Shengyun Yan, Fujian (CN); Biao Huang, Fujian (CN); Yuqian Wen, Fujian (CN); Jianxin Dou, Fujian (CN); Zhengshan Guo, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 15 days.

(21) Appl. No.: 18/298,392

(22) Filed: Apr. 11, 2023

(65) Prior Publication Data
US 2023/0249105 A1    Aug. 10, 2023

Related U.S. Application Data (63) Continuation of application No. PCT/CN2022/081753, filed on Mar. 18, 2022.

(30) Foreign Application Priority Data

Apr. 29, 2021   (CN) .......................... 202120924138.6

(51) Int. Cl.
*B01D 29/31* (2006.01)
*B01D 29/03* (2006.01)
(Continued)

(52) U.S. Cl.
CPC .......... *B01D 29/31* (2013.01); *B01D 29/035* (2013.01); *B01D 29/56* (2013.01); *B01D 39/10* (2013.01); *B05C 11/10* (2013.01)

(58) Field of Classification Search
None
See application file for complete search history.

(56) References Cited

U.S. PATENT DOCUMENTS 281,336  A  *  7/1883  Blackmer .............. B01D 17/00
                                                    210/411
483,847  A  *  10/1892  Jaeger .................... B01D 35/26
                                                    210/441
(Continued)

FOREIGN PATENT DOCUMENTS

CN         202136842 U      2/2012
CN         204637720 U      9/2015
(Continued)

OTHER PUBLICATIONS

Extended European search report issued on Aug. 18, 2023, in corresponding European patent Application No. 22783414.0, 6 pages.
(Continued)

*Primary Examiner* — Robert J Popovics
(74) *Attorney, Agent, or Firm* — XSENSUS LLP (57) ABSTRACT

Embodiments of this application relate to the field of lithium battery production technologies and disclose a slurry filtering apparatus and a coating system. The slurry filtering apparatus may include a rotating filter element and a gravity filter. The gravity filter may be provided with a feed port and (Continued)

a first discharge port. A height of the feed port on the gravity filter may be greater than that of the first discharge port on the gravity filter. The rotating filter may be connected to the feed port and is configured to provide a positive-pressure filtered slurry to the gravity filter. The first discharge port may be configured to convey a slurry filtered by the gravity filter to a coating apparatus.

10 Claims, 3 Drawing Sheets

(51) Int. Cl.
  *B01D 29/56* (2006.01)
  *B01D 39/10* (2006.01)
  *B05C 11/10* (2006.01)

(56) References Cited

U.S. PATENT DOCUMENTS

| | | | | |
|---|---|---|---|---|
| 502,583 A * | 8/1893 | Rankine | B01D 29/11 | 210/441 |
| 511,798 A * | 1/1894 | Rankine | B01D 35/147 | 210/418 |
| 540,810 A * | 6/1895 | Dimon | B01F 25/316 | 137/15.01 |
| 554,206 A * | 2/1896 | Wiselogel | B01D 33/06 | 210/434 |
| 1,192,948 A * | 8/1916 | Smith | B01D 24/10 | 137/861 |
| 1,253,162 A * | 1/1918 | Faber | B01D 33/09 | 210/395 |
| 1,367,946 A * | 2/1921 | Carrick | B01D 33/76 | 210/395 |
| 1,456,883 A * | 5/1923 | Deeks | B01D 35/005 | 235/95 A |
| 1,577,584 A * | 3/1926 | Miller, Jr. | B01D 33/073 | 210/402 |
| 1,667,465 A * | 4/1928 | Wait | B01D 33/466 | 210/791 |
| 1,677,503 A * | 7/1928 | Sweetland | B01D 29/66 | 210/417 |
| 1,843,242 A * | 2/1932 | Rafton | B01D 35/02 | 210/433.1 |
| 2,073,026 A * | 3/1937 | Bond | B01D 33/23 | 210/494.2 |
| 2,185,408 A * | 1/1940 | Kettenbach | A01C 1/08 | 366/225 |
| 2,294,179 A * | 8/1942 | Hawley | B01D 33/073 | 210/396 |
| 2,548,541 A * | 4/1951 | MacDonald | E03C 1/282 | 210/434 |
| 2,626,709 A * | 1/1953 | Krieble | B01D 17/045 | 210/DIG. 5 |
| 2,697,523 A * | 12/1954 | Bloksma | B01D 46/48 | 210/166 |
| 2,746,607 A * | 5/1956 | Hess | B01D 17/045 | 210/DIG. 5 |
| 3,347,379 A * | 10/1967 | Miller, Jr. | B01D 33/06 | 210/402 |
| 3,369,669 A * | 2/1968 | Loftin | B01D 29/01 | 210/411 |
| 3,502,213 A * | 3/1970 | Kuribayashi | B01D 37/04 | 210/138 |
| 3,695,448 A * | 10/1972 | Johansson | B30B 9/12 | 210/405 |
| 3,705,648 A * | 12/1972 | Arvanitakis | B01D 29/41 | 100/339 |
| 3,705,649 A * | 12/1972 | Arvanitakis | B01D 29/84 | 100/126 |
| 3,709,329 A * | 1/1973 | Mlodzinski | B07C 5/065 | 209/677 |
| 3,794,179 A * | 2/1974 | Doucet | B01D 29/94 | 210/433.1 |
| 3,876,548 A * | 4/1975 | Welles, Jr. | B01D 33/39 | 210/402 |
| 3,890,236 A * | 6/1975 | Harrell | B01D 35/02 | 210/457 |
| 3,896,005 A * | 7/1975 | Zuccolotto | B01D 35/18 | 202/185.1 |
| 3,979,289 A * | 9/1976 | Bykowski | B01D 33/76 | 210/403 |
| 4,062,776 A * | 12/1977 | Blok | B01D 33/50 | 210/403 |
| 4,089,781 A * | 5/1978 | Asp | B01D 29/52 | 210/411 |
| 4,115,271 A * | 9/1978 | Holt | B01D 33/72 | 210/402 |
| 4,136,832 A * | 1/1979 | Morita | B02C 19/0087 | 209/288 |
| 4,140,629 A * | 2/1979 | Martindale | B01D 33/60 | 210/403 |
| 4,198,299 A * | 4/1980 | Ewing | B01D 33/11 | 210/403 |
| 4,218,322 A * | 8/1980 | Kojima | B01D 33/503 | 210/402 |
| 4,306,975 A * | 12/1981 | Siewert | D21B 1/32 | 210/403 |
| 4,392,421 A * | 7/1983 | Yano | B02B 3/045 | 209/687 |
| 4,424,125 A * | 1/1984 | Martin | B01D 29/92 | 210/104 |
| 4,507,202 A * | 3/1985 | Nord | B01D 33/11 | 210/197 |
| 4,620,478 A * | 11/1986 | Corominas | B01D 33/327 | 99/533 |
| 4,857,180 A * | 8/1989 | Eriksson | B07B 1/528 | 209/384 |
| 4,966,718 A * | 10/1990 | Johnson | B01D 29/904 | 210/791 |
| 5,114,596 A * | 5/1992 | Laterra | B01D 29/114 | 134/22.12 |
| 5,133,860 A * | 7/1992 | Tai | B01D 33/76 | 210/411 |
| 5,160,440 A * | 11/1992 | Merai | B01D 29/94 | 34/388 |
| 5,480,547 A * | 1/1996 | Williamson | B01D 17/045 | 210/DIG. 5 |
| 5,507,396 A * | 4/1996 | Hauch | B07B 1/48 | 209/406 |
| 5,628,916 A * | 5/1997 | Stevens | B01D 29/52 | 210/799 |
| 6,059,963 A * | 5/2000 | Horakova | B01D 21/003 | 210/150 |
| 6,227,379 B1 * | 5/2001 | Nesseth | B01D 33/215 | 210/402 |
| 6,305,552 B1 * | 10/2001 | Coleman | B07B 1/24 | 209/664 |
| 6,500,344 B1 * | 12/2002 | Lee | B01D 29/70 | 210/197 |
| 6,579,456 B2 * | 6/2003 | Frey | B01D 29/01 | 210/255 |
| 6,884,360 B2 * | 4/2005 | Chang | B01D 29/86 | 210/248 |
| 7,001,515 B2 * | 2/2006 | Sawhill | A23B 4/26 | 210/402 |
| 7,037,437 B2 * | 5/2006 | Sawhill | B01D 33/073 | 210/402 |
| 7,550,077 B2 * | 6/2009 | Graf | E04D 13/08 | 52/12 |
| 7,611,604 B2 * | 11/2009 | Salmisuo | B01D 1/065 | 159/901 |
| 8,211,319 B2 * | 7/2012 | Wilsak | B01D 29/114 | 585/812 |
| 8,764,975 B2 * | 7/2014 | Salmisuo | A61L 11/00 | 422/26 |
| 9,108,872 B2 * | 8/2015 | Salmisuo | B09B 3/45 | |
| 9,352,983 B2 * | 5/2016 | Massey | B01D 24/40 | |

(56) References Cited

U.S. PATENT DOCUMENTS

| | | | | |
|---|---|---|---|---|
| 11,717,775 | B2* | 8/2023 | Maiworm | B01D 29/52 |
| | | | | 210/323.1 |
| 11,980,837 | B2* | 5/2024 | Sundstr?m | B01D 33/067 |
| 12,036,485 | B1* | 7/2024 | Smith | C02F 1/004 |
| 2002/0002909 | A1* | 1/2002 | Frey | B01D 29/018 |
| | | | | 99/291 |
| 2003/0102258 | A1* | 6/2003 | Olapinski | B01D 63/06 |
| | | | | 427/230 |
| 2005/0000919 | A1* | 1/2005 | Chang | B01D 29/86 |
| | | | | 210/791 |
| 2005/0077254 | A1* | 4/2005 | Sawhill | A23B 4/28 |
| | | | | 210/402 |
| 2005/0211609 | A1* | 9/2005 | Mouhebaty | B01D 35/1573 |
| | | | | 210/341 |
| 2010/0258147 | A1* | 10/2010 | Isobe | B08B 3/102 |
| | | | | 134/151 |
| 2012/0267323 | A1* | 10/2012 | Salmisuo | C02F 11/128 |
| | | | | 210/772 |
| 2014/0251923 | A1* | 9/2014 | Salmisuo | A61L 11/00 |
| | | | | 210/768 |
| 2022/0305448 | A1* | 9/2022 | Zhang | F26B 25/063 |
| 2023/0249105 | A1* | 8/2023 | Yan | B01D 29/356 |
| | | | | 210/314 |

FOREIGN PATENT DOCUMENTS

| | | |
|---|---|---|
| CN | 204841199 U | 12/2015 |
| CN | 105771381 A | 7/2016 |
| CN | 112170125 A | 1/2021 |
| CN | 112520897 A | 3/2021 |
| CN | 212998653 U | 4/2021 |
| CN | 215585615 U | 1/2022 |
| JP | 2011-115732 A | 6/2011 |
| JP | 2012-217989 A | 11/2012 |
| WO | 2011/024253 A1 | 3/2011 |
| WO | 2012/138048 A2 | 10/2012 |

OTHER PUBLICATIONS

Notice of Grant issued on Nov. 17, 2021, in corresponding Chinese patent Application No. 202120924138.6, 2 pages.
Office Action issued Nov. 7, 2023 in Japanese Patent Application No. 2022-558518, 10 pages.
International Search Report and Written Opinion mailed on Jun. 8, 2022, received for PCT Application PCT/CN2022/081753, filed on Mar. 18, 2022, 12 pages with English translation.

* cited by examiner

SLURRY FILTERING APPARATUS AND COATING SYSTEM

CROSS-REFERENCE TO RELATED APPLICATIONS

This application is a continuation of International Application No. PCT/CN2022/081753, filed Mar. 18, 2022, which claims priority to Chinese Patent Application No. 202120924138.6, filed on Apr. 29, 2021 and entitled "SLURRY FILTERING APPARATUS AND COATING SYSTEM", each of which is incorporated herein by reference in its entirety.

TECHNICAL FIELD

Embodiments of this application relate to the field of lithium battery production technologies, and in particular, to a slurry filtering apparatus and a coating system.

BACKGROUND

In a production process of a lithium battery, an electrode plate needs to be coated with a slurry. Coating quality affects the electrical performance and safety performance of the battery. Therefore, in a coating process, requirements for slurry conveying, slurry quality, and the like are relatively high. For example, the slurry cannot contain excessive impurities and large particles. However, because the slurry is in a conveying pipeline, with time passing by, the slurry easily deposits and agglomerates to form large-particle soft substances. Under a positive pressure, such large-particle soft substances easily penetrate a filter screen, resulting in scratches or fractures of the electrode plate during coating, and affecting coating quality.

SUMMARY

In view of the foregoing problem, embodiments of this application provide a slurry filtering apparatus and a coating system to reduce a quantity of large-particle soft substances formed by deposition and agglomeration in a slurry and improve coating quality.

According to an aspect of the embodiments of this application, a slurry filtering apparatus is provided, including a rotating filter element and a gravity filter. The gravity filter is provided with a feed port and a first discharge port. A height of the feed port on the gravity filter is greater than that of the first discharge port on the gravity filter. The rotating filter element is connected to the feed port and is configured to provide a positive-pressure filtered slurry to the gravity filter. The first discharge port is configured to convey a slurry filtered by the gravity filter to a coating apparatus.

In an optional manner, the gravity filter includes a tank and a filter screen disposed inside the tank. The feed port and the first discharge port are both disposed on the tank, and a height of the filter screen in the tank is between the height of the feed port and the height of the first discharge port.

In an optional manner, the filter screen includes a bottom wall and a side wall disposed around the bottom wall. The side wall and the bottom wall enclose to form a collecting and filtering cavity with an opening at the top. Both the bottom wall and the side wall are provided with filter holes.

In an optional manner, the filter screen is detachably disposed inside the tank.

In an optional manner, an inner peripheral wall of the tank is provided with a support convex portion. The support convex portion is located between the side wall and the inner peripheral wall of the tank. A flange is further disposed on an outer side of the side wall close to the opening of the collecting and filtering cavity, and the flange abuts against the top of the support convex portion.

In an optional manner, the mesh number of the filter screen is 20-70.

In an optional manner, the tank is further provided with a second discharge port. A lowest point of the second discharge port on the tank is located between the feed port and the filter screen, and the second discharge port communicates with the first discharge port outside the tank.

In an optional manner, the slurry filtering apparatus further includes a transfer tank and a buffer tank. An outlet of the transfer tank communicates with the feed port, and the rotating filter element is located between the outlet of the transfer tank and the feed port. The transfer tank is configured to provide a to-be-filtered slurry to the rotating filter element. An inlet of the buffer tank communicates with the first discharge port, the buffer tank is configured to store a slurry filtered by the gravity filter, and the filtered slurry is conveyed to the coating apparatus through an outlet of the buffer tank.

In an optional manner, the slurry filtering apparatus further includes a secondary filter element. The secondary filter element is connected to the outlet of the buffer tank. A filtering particle size of the secondary filter element is smaller than that of the rotating filter element.

In an optional manner, the filtering particle size of the rotating filter element is greater than 0.15 mm, and the filtering particle size of the secondary filter element is greater than 0.075 mm.

According to another aspect of the embodiments of this application, a coating system is provided, including a coating apparatus and the foregoing slurry filtering apparatus. The slurry filtering apparatus is configured to provide a filtered coating slurry to the coating apparatus.

In the embodiments of this application, the rotating filter element is connected to the feed port of the gravity filter. Because the height of the feed port of the gravity filter is greater than that of the first discharge port on the gravity filter, the slurry flows from top to bottom in the gravity filter due to gravity, and large-particle soft substances are not subject to excessive positive pressure and are difficult to penetrate the gravity filter. Therefore, the large-particle soft substances can be effectively intercepted by the gravity filter, and the gravity filter can provide a slurry with less impurities of large-particle soft substances to the coating apparatus from the first discharge port. This reduces a quantity of large-particle soft substances in the slurry and solves a problem that coating quality is affected by fractures, scratches, and the like of an electrode plate caused during coating due to existence of a large quantity of large-particle soft substances, thereby improving the coating quality.

The above descriptions are merely an overview of the technical solutions of this application. To understand technical means of this application more clearly, the technical means may be implemented in accordance with content of this specification. To make the above and other purposes, features, and advantages of this application more comprehensible, the following implementations of this application are specifically given as examples.

BRIEF DESCRIPTION OF DRAWINGS

Other advantages and benefits become apparent to persons of ordinary skill in the art by reading detailed descrip

Reference signs in descriptions of embodiments are as follows:

1. coating system; 10. coating apparatus; 11. coating extrusion head; 12. unwinding assembly; 13. drying assembly; 14. winding assembly; 20. slurry filtering apparatus; 30. rotating filter element;
40. gravity filter; 41. feed port; 42. first discharge port; 43. tank; 431. support convex portion; 44. filter screen; 441. bottom wall; 442. side wall; 443. flange; 45. end cover; 46. second discharge port; 47. three-way pipe;
50. transfer tank; 60. buffer tank; and 70. secondary filter element.

DESCRIPTION OF EMBODIMENTS

The following describes in detail embodiments of technical solutions of this application with reference to accompanying drawings. The following embodiments are only used to more clearly describe the technical solutions of this application. Therefore, they are only used as examples and cannot be used to limit the scope of protection of this application.

In a filtering process, with the time of being in a conveying pipeline passing by, a slurry easily forms large-particle soft substances by deposition and agglomeration. Currently, during slurry filtering, a slurry usually needs to be pushed by using a pump body or other power devices to pass through a filter element for filtering. In this positive-pressure filtering manner, large-particle soft substances easily penetrate the filter element under a positive pressure. As a result, a filtering apparatus cannot effectively perform filtering and interception. In this case, during coating, large-particle soft substances are coated on a surface of an electrode plate, resulting in particle scratches on the surface of the electrode plate or even fractures of the electrode plate.

To solve the foregoing problem, the inventors redesigned and improved a structure of the existing filtering apparatus and found that a manner of first performing positive-pressure filtering on a slurry through a filter element and then performing filtering by using a gravity filtering apparatus can effectively filter out most of large-particle soft substances in the slurry to solve a problem that coating quality is affected due to large-particle soft substances.

Figure 1:
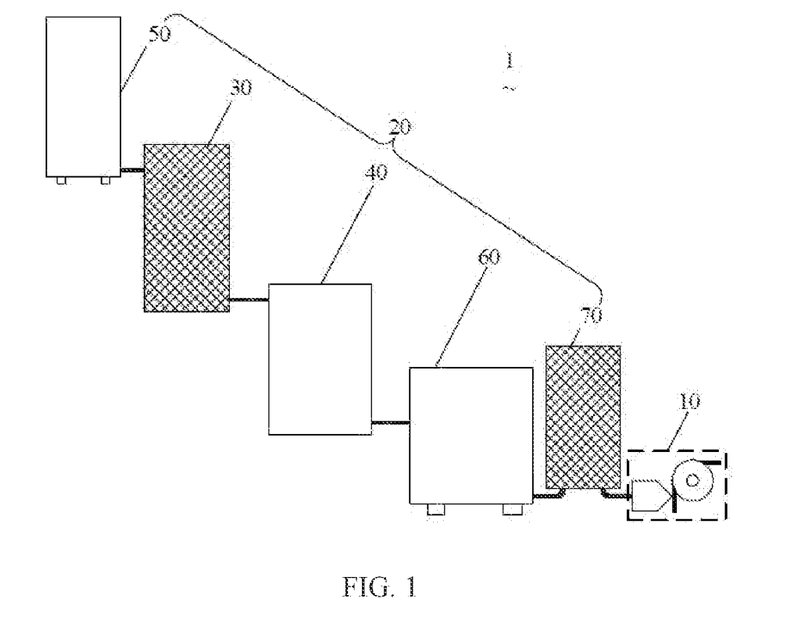
- FIG. 1 is a schematic structural diagram of a coating system according to an embodiment of this application.
Figure 2:
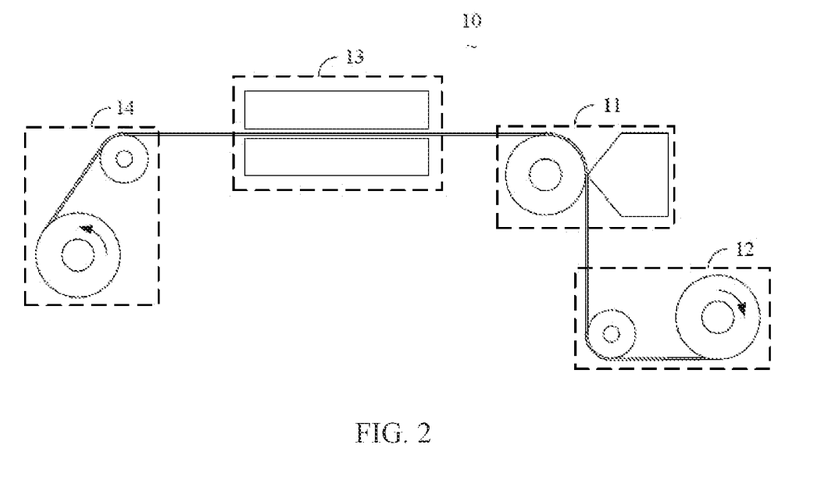
FIG. 2 is a schematic structural diagram of a coating apparatus according to an embodiment of this application.

Referring to FIG. 1 and FIG. 2, FIG. 1 is a schematic structural diagram of a coating system 1 according to an embodiment of this application, and FIG. 2 is a schematic structural diagram of a coating apparatus 10 according to an embodiment of this application. This embodiment of this application provides a coating system 1. The coating system 1 includes a coating apparatus 10 and a slurry filtering apparatus 20. The slurry filtering apparatus 20 is configured to provide a filtered coating slurry to the coating apparatus 10. The coating apparatus 10 may be a coating machine. The coating machine includes an extrusion head 11. The extrusion head 11 is configured to apply the slurry provided by the slurry filtering apparatus 20 on an electrode plate of a battery.

In some embodiments, the coating machine may further include an unwinding assembly 12, a drying assembly 13, and a winding assembly 14. The unwinding assembly 12, the extrusion head 11, the drying assembly 13, and the winding assembly 14 are sequentially disposed in a conveying direction of the electrode plate. The unwinding assembly 12 is configured to deliver the electrode plate to be coated with a slurry to the extrusion head 11, so that the extrusion head 11 can apply the slurry on the surface of the to-be-coated electrode plate. The drying assembly 13 is configured to dry the electrode plate that has been coated with the slurry. The winding assembly 14 is configured to wind up the electrode plate that has been coated with slurry and dried.

In some embodiments, the coating machine may further include other components, for example, a control assembly, but no limitation is set thereto. The control assembly is electrically connected to all of the extrusion head 11, the unwinding assembly 12, the drying assembly 13, and the winding assembly 14 to control and coordinate operations of all assemblies to coat the electrode plate.

Figure 3:
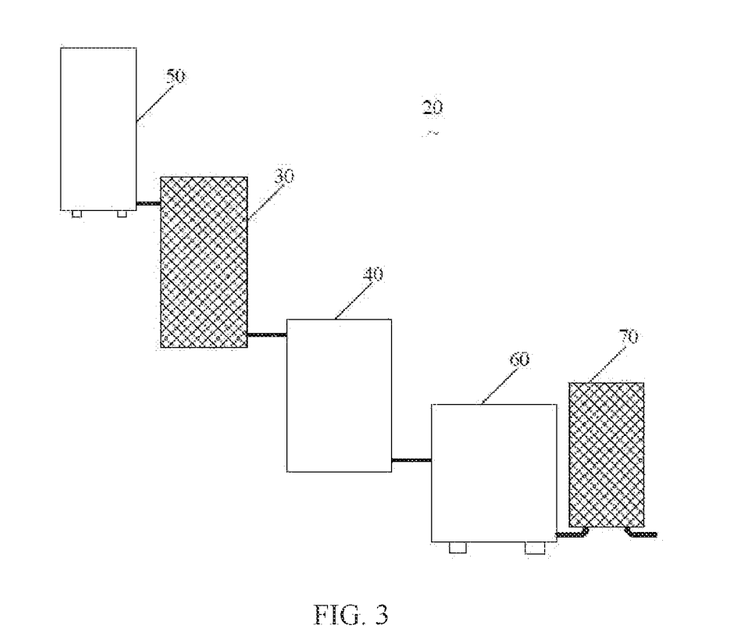
FIG. 3 is a schematic structural diagram of a slurry filtering apparatus according to an embodiment of this application.

Referring to FIG. 3 and FIG. 1, FIG. 3 is a schematic structural diagram of a slurry filtering apparatus 20 according to an embodiment of this application. In some embodiments, the slurry filtering apparatus 20 includes a rotating filter element 30 and a gravity filter 40. The gravity filter 40 is provided with a feed port 41 and a first discharge port 42. A height of the feed port 41 on the gravity filter 40 is greater than that of the first discharge port 42 on the gravity filter 40. The rotating filter element 30 is connected to the feed port 41. The rotating filter element 30 is configured to provide a positive-pressure filtered slurry to the gravity filter 40. The first discharge port 42 is configured to convey a slurry filtered by the gravity filter 40 to a coating apparatus 10.

The rotating filter element 30 may be directly installed in a feed pipeline communicating with the feed port 41 of the gravity filter 40, or may be installed in a prefilter communicating with the feed port 41 of the gravity filter 40.

When the slurry flows into the gravity filter 40 through the rotating filter element 30, the rotating filter element 30 can block hard particles in the slurry. However, under a push of a positive pressure, large-particle soft substances penetrate the rotating filter element 30 and enters the gravity filter 40 from the feed port 41. Because the height of the feed port 41 of the gravity filter 40 is greater than that of the first discharge port 42 of the gravity filter 40, the slurry flows from top to bottom in the gravity filter 40 due to gravity, and large-particle soft substances are not subject to excessive positive pressure and are difficult to penetrate the gravity filter 40. Therefore, the large-particle soft substances can be intercepted by the gravity filter 40, and the gravity filter 40 can provide a slurry with less impurities of large-particle soft substances to the coating apparatus 10 from the first discharge port 42. This reduces a quantity of large-particle soft substances in the slurry and solves a problem that coating quality is affected by fractures, scratches, and the like of an electrode plate caused during coating due to existence of a large quantity of large-particle soft substances, thereby improving the coating quality.

Figure 4:
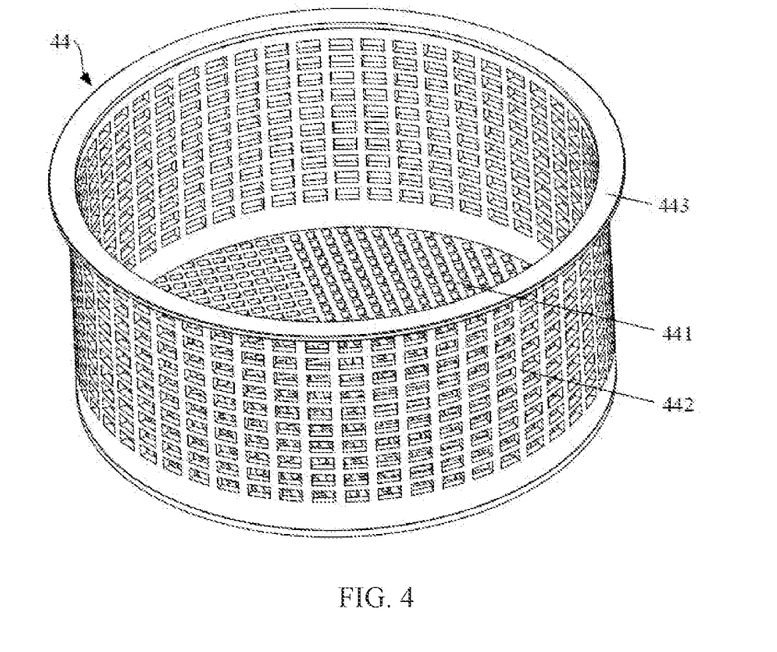
FIG. 4 is a schematic structural diagram of a gravity filter according to an embodiment of this application.
Figure 5:
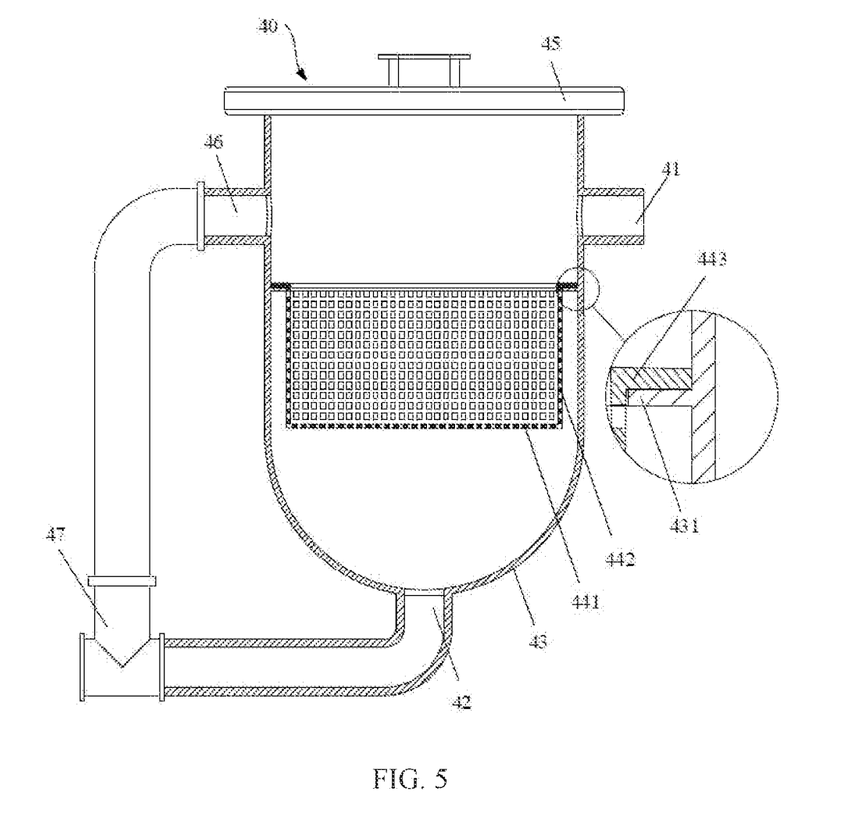
FIG. 5 is a schematic structural diagram of a filter screen according to an embodiment of this application.

Referring to FIG. 4 and FIG. 5, FIG. 4 is a schematic structural diagram of a gravity filter 40 according to an embodiment of this application, and FIG. 5 is a schematic structural diagram of a filter screen 44 according to an embodiment of this application. In some embodiments, the gravity filter 40 includes a tank 43 and a filter screen 44 disposed inside the tank 43, a feed port 41 and a first discharge port 42 are both disposed on the tank 43, and a height of the filter screen 44 in the tank 43 is between a height of the feed port 41 and a height of the first discharge port 42.

The filter screen 44 is configured to filter a slurry entering the gravity filter 40 from the feed port 41, so that a slurry filtered through the filter screen 44 by using gravity flows out from the first discharge port 42.

In this embodiment, the filter screen 44 is disposed inside the tank 43, and a height of the filter screen 44 on the tank 43 is between a height of the feed port 41 and a height of the first discharge port 42, so that the filter screen 44 can divide an internal space of the tank 43 into two parts: an unfiltered chamber and a filtered chamber. The unfiltered chamber communicates with the feed port 41, the filtered chamber communicates with the first discharge port 42, and the unfiltered chamber communicates with the filtered chamber through filter holes in the filter screen 44. After the slurry enters the unfiltered chamber inside the tank 43 through the feed port 41, the filter screen 44 intercepts large-particle soft substances and hard particles whose particle sizes are larger than a hole diameter of the filter screen 44 in the slurry. Because the slurry flows inside the tank 43 under gravity, it is difficult for the large-particle soft substances in the slurry to enter the filtered chamber through the filter screen 44, so as to reduce a quantity of large-particle soft substances in the slurry.

In some embodiments, the filter screen 44 includes a bottom wall 441 and a side wall 442 disposed around the bottom wall 441. The side wall 442 and the bottom wall 441 enclose to form a collecting and filtering cavity with an opening at the top. Both the bottom wall 441 and the side wall 442 are provided with filter holes.

The filter screen 44 may be a cylinder with an opening at the top. For example, the filter screen 44 may be a cylindrical cylinder or a prismatic cylinder.

The side wall 442 is disposed around an outer circumference of the bottom wall 441 and encloses the collecting and filtering cavity with an opening at the top, so that the opening of the filter screen 44 can communicate with the feed port 41, and the slurry flows into the collecting and filtering cavity from the feed port 41 to be filtered. Because both the side wall 442 and the bottom wall 441 of the filter screen 44 are provided with filter holes, both the side wall 442 and the bottom wall 441 of the filter screen 44 can filter the slurry. This can increase a filtering speed and a flow rate of the slurry and improve filtering efficiency.

It can be understood that in some other embodiments, the filter screen 44 may alternatively be of a sheet structure.

In some embodiments, the filter screen 44 may be detachably connected to the inside of the tank 43. In this way, when the filter screen 44 is blocked, the filter screen 44 can be removed from the tank 43 for replacement or cleaning before recycling, thereby reducing use costs. The filter screen 44 may be made of stainless steel.

In some embodiments, an inner peripheral wall of the tank 43 is provided with a support convex portion 431. The support convex portion 431 is located between the side wall 442 and the inner peripheral wall of the tank 43. A flange 443 is further disposed on an outer side of the side wall 442 close to the opening of the collecting and filtering cavity, and the flange 443 abuts against the top of the support convex portion 431.

The flange 443 is an outer flange that is disposed outside the top of the side wall 442 and protruding away from the collecting and filtering cavity. The support convex portion 431 may be a convex structure that is continuously disposed around a central axis of the tank 43 along the inner peripheral wall of the tank 43, or may be a convex structure that is spaced apart around the central axis of the tank 43 along the inner peripheral wall of the tank 43.

In this embodiment, the flange 443 on the filter screen 44 abuts against the support convex portion 431, so that the filter screen 44 can be nested in the tank 43. This manner facilitates disassembly and assembly. When the filter screen 44 is blocked, a user can easily remove the filter screen 44 from the tank 43 for replacement or cleaning.

In some other embodiments, the filter screen 44 and the tank 43 may alternatively be connected and fixed to each other in another detachable manner. For example, a clamping structure for mutual clamping is disposed between the inner peripheral wall of the tank 43 and the side wall 442.

In some embodiments, the tank 43 may be of a cylinder structure with an opening on the top, and the opening of the tank 43 is covered with an end cover 45. The end cover 45 is detachably connected to the tank 43, so that a user can open the end cover 45 and take out the filter screen 44 inside the tank 43 when necessary.

In some embodiments, the mesh number of the filter screen 44 is 20-70. For example, the mesh number of the filter screen 44 may be 20, 30, 40, 50, 60, or 70.

The larger the mesh number of the filter screen 44 is, the smaller a diameter of a filter hole and a particle size of particles that can be filtered are. The smaller the mesh number of the filter screen 44 is, the larger the hole diameter of the filter screen 44 and the particle size of the particles that can be filtered are. If the mesh number of the filter screen 44 is 20-70, the corresponding diameter of the filter hole of the filter screen 44 is 0.212-0.850 mm. That the diameter of the filter hole of the filter screen 44 falls within this mesh range not only ensures that hard particles and agglomerated particles whose particle sizes are larger than this range are intercepted by the filter screen 44, but also ensures that flow and a flow rate of the slurry can be sufficient for filtering. This avoids a coating quality problem caused by insufficient slurry supply during coating when the flow and the flow rate of the slurry for filtering become smaller due to an excessively small filtering particle size.

Still referring to FIG. 1, FIG. 4, and FIG. 5, in some embodiments, the tank 43 is further provided with a second discharge port 46. A lowest point of the second discharge port 46 in the tank 43 is located between the feed port 41 and the filter screen 44, and the first discharge port 42 communicates with the second feed port 41 outside the tank 43.

The second discharge port 46 may alternatively be located at a same height as the feed port 41 on the side wall 442 of the tank 43, and the first discharge port 42 is disposed at the bottom of the tank 43, as long as it is ensured that a minimum height of the second discharge port 46 on the tank 43 is greater than the height of the filter screen 44 in the tank 43. The second discharge port 46 is applied when the slurry entering the tank 43 fails to be filtered through the filter screen 44 and then fails to completely flow out from the first discharge port 42 after the filter screen 44 is blocked. In this case, the slurry that has not been filtered by the filter screen 44 can be directly conveyed outward to the coating apparatus 10 through the second discharge port 46, so that the filtering apparatus can continuously provide the coating slurry to the coating apparatus 10.

In some embodiments, the slurry filtering apparatus 20 further includes a transfer tank 50 and a buffer tank 60. An outlet of the transfer tank 50 communicates with the feed port 41 of the tank 43. The rotating filter element 30 is located between the outlet of the transfer tank 50 and the feed port 41 of the tank 43. The transfer tank 50 is configured to provide a to-be-filtered slurry to the rotating filter element 30. An inlet of the buffer tank 60 communicates with the first discharge port 42, and the buffer tank 60 is configured to store a slurry filtered by the gravity filter 40. The filtered slurry is conveyed to the coating apparatus 10 through an outlet of the buffer tank 60.

Specifically, the gravity filter 40 further includes a three-way pipe 47. Two openings of the three-way pipe 47 communicate with the first discharge port 42 and the second discharge port 46 respectively, and the other discharge opening of the three-way pipe 47 communicates with the outlet of the transfer tank 50.

In some embodiments, the slurry filtering apparatus 20 further includes a secondary filter element 70. The secondary filter element 70 is connected to the outlet of the buffer tank, and a filtering particle size of the secondary filter element 70 is smaller than that of the rotating filter element 30. In other words, a diameter of a screen hole of the secondary filter element 70 is smaller than that of the rotating filter element 30. The secondary filter element 70 may be directly installed in a feeding pipeline that communicates with the discharge port of the gravity filter 40, or may be installed in a post filter that communicates with the discharge port of the gravity filter 40.

In this embodiment, the secondary filter element 70 is disposed at the outlet of the buffer tank, so that the secondary filter element 70 can further filter out particle impurities in the slurry that have not been filtered by the rotating filter element 30 and the gravity filter 40.

Certainly, in some other embodiments, the secondary filter element 70 may alternatively be disposed between the rotating filter element 30 and the feed port 41 of the gravity filter 40.

In some embodiments, the filtering particle size of the rotating filter element 30 is greater than 0.15 mm, and the filtering particle size of the secondary filter element 70 is greater than 0.075 mm. In other words, the diameter of the screen hole of the rotating filter element 30 is less than 0.15 mm and greater than 0.075 mm, and the diameter of the screen hole of the secondary filter element 70 is less than 0.075 mm. When the hole diameters of the rotating filter element 30 and the secondary filter element 70 fall within this hole diameter range, after the slurry is filtered through the rotating filter element 30 and the secondary filter element 70, most of hard particle impurities can be filtered out, reducing impact of hard particles on coating quality.

It should be noted that, unless otherwise specified, the technical terms or scientific terms used in the embodiments of this application should have a general meaning understood by persons skilled in the art to which the embodiments of this application belong. In the descriptions of the embodiments of this application, orientations or position relationships indicated by the terms "height", "top", "bottom", "inside", "outside", and the like are based on orientations or position relationships shown in the accompanying drawings and are merely intended for ease of description of the embodiments of this application, rather than indicating or implying that an apparatus or a component needs to have a particular direction or needs to be constructed and operated in a particular orientation. Therefore, this shall not be construed as any limitation on the embodiments of this application. Finally, it should be noted that the above embodiments are merely intended for describing the technical solutions of this application, but not for limiting this application. Although this application is described in detail with reference to the above embodiments, persons of ordinary skill in the art should understand that they may still make modifications to the technical solutions described in the above embodiments or make equivalent replacements to some or all technical features thereof. These modifications or replacements do not make the essence of the corresponding technical solutions depart from the scope of the technical solutions of the embodiments of this application, and should all fall within the scope of the claims and this specification of this application. In particular, the technical features mentioned in the embodiments can be combined in any manner as long as there is no structural conflict. This application is not limited to the specific embodiments disclosed in this specification, but includes all technical solutions falling within the scope of the claims.

The invention claimed is:

1. A slurry filtering apparatus, comprising:
   a rotating filter having an inlet and an outlet; and
   a gravity filter including:
      a tank including:
         a filter screen disposed within the tank dividing the tank into an upstream unfiltered region and a downstream filtered region;
         a feed port in fluid communication with the outlet of the rotating filter and the upstream unfiltered region permitting introduction of a stream flowing from the outlet of the rotating filter into the upstream unfiltered region;
         a first discharge port extending through a lower wall portion of tank and being in fluid communication with the downstream filtered region, permitting a filtered stream to exit the tank; and
         a second discharge port in fluid communication with the unfiltered region, permitting a stream to exit the unfiltered region of the tank without passing through the filter screen;
      wherein the feed port is elevationally above the first discharge port and elevationally below the outlet of the rotating filter thereby providing a pressure head sufficient for slurry to flow through the filter screen and the resultant filtered stream to flow through the first discharge port, and to a coating apparatus, all by gravity.

2. The slurry filtering apparatus of claim 1, wherein the filter screen is detachably disposed inside the tank.

3. The slurry filtering apparatus of claim 1, wherein the filter screen is cylindrically shaped with a bottom wall and a side wall disposed around the bottom wall, the side wall and the bottom wall defining a collecting and filtering cavity with an open top, both the bottom wall and the side wall are provided with filter holes.

4. The slurry filtering apparatus of claim 3, wherein a flange radially extends from a top of the side wall.

5. The slurry filtering apparatus of claim 4, wherein an inner peripheral wall of the tank is provided with a support convex portion, the support convex portion is located between the side wall and the inner peripheral wall of the tank, wherein the flange abuts against the top of the support convex portion.

6. The slurry filtering apparatus of claim 1, wherein a mesh number of the filter screen is 20-70.

7. The slurry filtering apparatus of claim 1, wherein a lowest point of the second discharge port on the tank is located between the feed port and the filter screen, and the second discharge port is in fluid communication with the first discharge port outside the tank.

8. The slurry filtering apparatus of claim 1, wherein the slurry filtering apparatus further comprises:
   a transfer tank and a buffer tank, an outlet of the transfer tank is in fluid communication with the feed port, the rotating filter is located between the outlet of the transfer tank and the feed port, the transfer tank is capable of providing a to-be-filtered slurry to the rotating filter, an inlet of the buffer tank being in fluid communication with the first discharge port, the buffer tank is capable of storing the filtered stream, and the filtered stream is conveyed to the coating apparatus through an outlet of the buffer tank.

9. The slurry filtering apparatus of claim 8, wherein the slurry filtering apparatus further comprises a secondary filter, the secondary filter is connected to the outlet of the buffer tank, and a filtering particle size of the secondary filter is smaller than that of the rotating filter.

10. The slurry filtering apparatus of claim 9, wherein the filtering particle size of the rotating filter is greater than 0.15 mm, and the filtering particle size of the secondary filter is greater than 0.075 mm.

* * * * *